United States Patent

Anderson et al.

[15] 3,646,777

[45] Mar. 7, 1972

[54] TORQUE TRANSMITTING COUPLING

[72] Inventors: James H. Anderson; James H. Anderson, Jr., both of York, Pa.

[73] Assignee: Coupling Corporation of America, New Hope, Va.

[22] Filed: Mar. 31, 1970

[21] Appl. No.: 24,095

[52] U.S. Cl. ................................................64/15 R, 64/30 R
[51] Int. Cl. ...........................................................F16d 3/52
[58] Field of Search ......................64/15, 30 R, 30 C; 192/65

[56] References Cited

UNITED STATES PATENTS

| | | | |
|---|---|---|---|
| 2,707,108 | 4/1955 | Schlotter | 192/65 X |
| 2,708,836 | 5/1955 | Stuart | 64/30 |
| 2,533,973 | 12/1950 | Starkey | 64/30 |
| 3,395,553 | 8/1968 | Stout | 64/30 X |
| 869,820 | 10/1907 | Winans | 192/65 X |

*Primary Examiner*—Kenneth W. Sprague
*Attorney*—Kemon, Palmer & Estabrook

[57] ABSTRACT

A coupling for transmission of torque between adjacent substantially aligned shafts includes a pair of bolting flanges carried at the end of one shaft and a smooth cylindrical section at the adjacent end of the other shaft. Each bolting flange includes a bore sized to snugly surround the end of the other shaft and a counterbore of larger diameter to enclose one or more Belleville springs in the annular space between the counterbore and the adjacent end of the other shaft. Reducing the axial spacing between the flanges flexes the Belleville springs to reduce their internal diameter and increase their external diameter thus increasing the torque transmitting capability of the coupling.

5 Claims, 4 Drawing Figures

PATENTED MAR 7 1972          3,646,777

INVENTORS
JAMES H. ANDERSON
JAMES H. ANDERSON, JR.

BY Kenon, Palmer & Estabrook
ATTORNEYS

TORQUE TRANSMITTING COUPLING

CROSS-REFERENCE TO RELATED CASES

The present invention is an improvement over the couplings shown in my prior application Ser. No. 779,925 filed Nov. 26, 1968.

BACKGROUND OF THE INVENTION

In the aforementioned copending application some forms of bolting flanges are disclosed which include integral flexible conical strut portions which deflect when the axial separation between the flange parts is reduced to decrease the internal diameter of the flanges and thus provide a firmer coupling between the shafts. It is an object of the present invention to provide an improved version of such couplings and one which will permit the transmission of higher torques with the same or less force applied to reduce axial separation of the flanges.

DETAILED DESCRIPTION OF THE DRAWINGS

Figure 1:
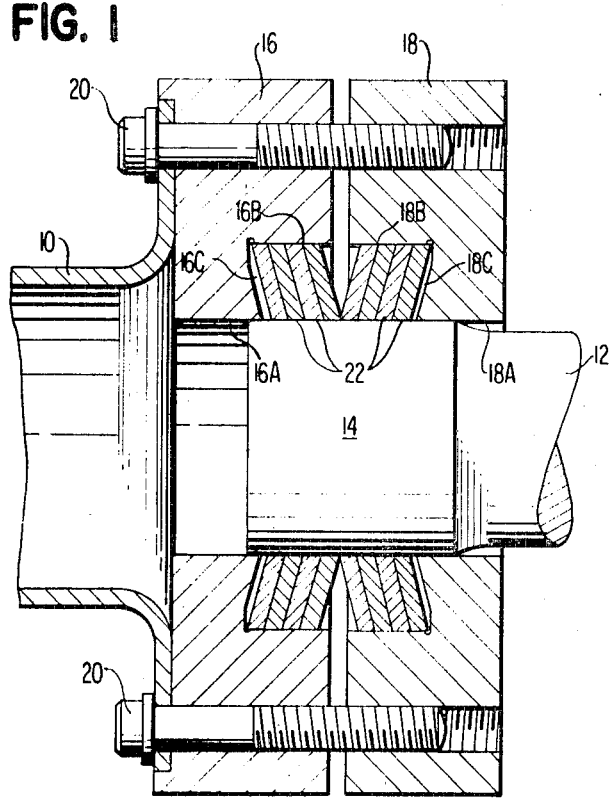
FIG. 1 is a side elevation partially in section of a preferred embodiment of the coupling of the present invention.
Figure 2:
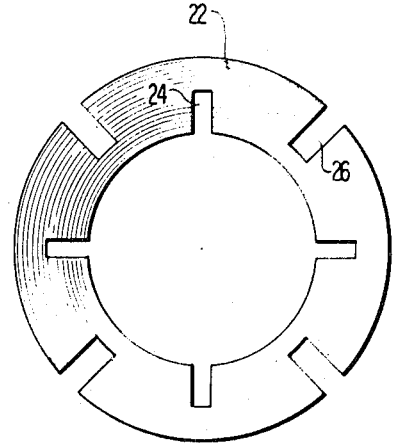
FIG. 2 is a plan view of a special form of Belleville spring useful in the present invention.

Referring first to FIGS. 1 and 2 of the accompanying drawings, a pair of shafts 10 and 12 which are axially aligned are coupled by a preferred embodiment of torque-transmitting coupling in accordance with the present invention. The shaft 12 includes an end portion 14 which is cylindrical and smooth. Carried on the adjacent end of the shaft 10 are a pair of bolting flanges 16 and 18, the axial spacing between which is adjustable by means of a ring of studs 20, two of which are shown in this figure. Each flange includes a central bore 16A and 18A, respectively, the diameters of which are such as to permit an easy fit on the cylindrical portion 14 of the shaft 12. Each flange also includes a counterbore 16B and 18B, respectively, which counterbores are substantially larger in diameter than the bores 16A and 18A. The counterbores 16B and 18B face each other in the assembled position of the flanges as shown in this figure and when assembled on the end of the shaft 12, each defines together with the cylindrical end portion of the shaft 14 an annular chamber 16C and 18C, respectively. These annular chambers in this embodiment are substantially filled with a plurality of Belleville springs 22. As is known in the art, these springs are annular members which are conically shaped. Those in the chamber 16C are assembled so that the apex of the cones face toward the apices of the cones of the members in the chamber 18C.

The springs 22 are preferably radially slotted at regular points around the inner and outer periphery as indicated at 24 and 26 in the plan view of FIG. 2. The presence of such slots in the Belleville springs of course increases their flexibility.

The parts of the coupling are loosely assembled to substantially the relative position shown in FIG. 1. Following this initial assembly, tightening of the ring of studs 20 brings the two flanges 16 and 18 axially closer together and in so doing flexes each of the Belleville springs 22 in a direction which tends to decrease their internal diameter and increase their external diameter. This results in a very material tightening of the coupling and permits the transmission of high-torques from one shaft to another. The coupling is easily and quickly released, on the other hand, by loosening the ring of studs 20 as this releases the stress on the springs 22 and permits them to return to their unstressed internal and external diameters in which condition the coupling is readily disassembled.

Figure 3:
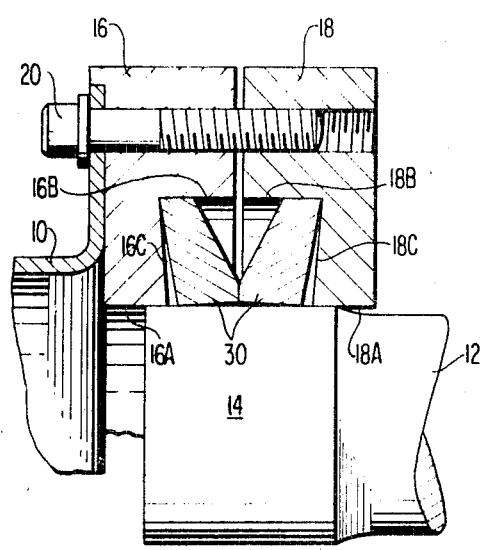
FIG. 3 is a view similar to FIG. 1 showing a modified version of the coupling.

The embodiment shown in FIG. 3 is substantially the same as that in FIG. 1 with the exception that there are only two spring elements 30, each of which is substantially of greater cross section than those shown at 22 in FIG. 1. The springs or struts 30 may be radially slotted as in the case of the springs 22 shown in FIG. 2.

Figure 4:
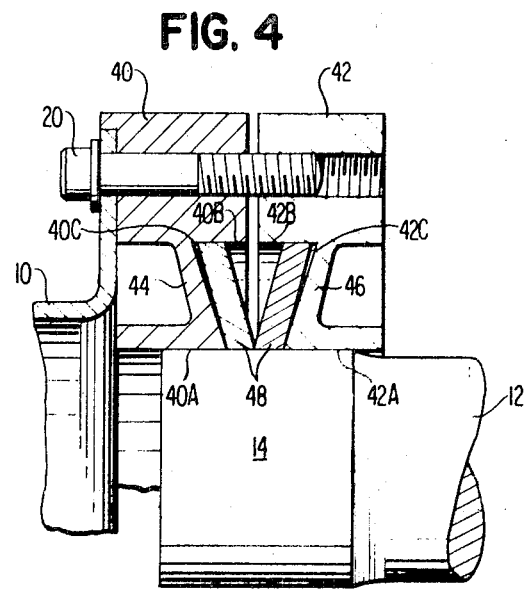
FIG. 4 is a plan view partially in section of a still further alternative embodiment of the present invention.

Turning lastly to FIG. 4 of the attached drawings, a similar coupling is shown but in this instance the flanges 40 and 42 each include integral strut portions 44 and 46, respectively, which portions are conical and in their assembled position the apices of the cones face toward each other. The main bores of the flanges 40A and 42A, as in the case of the FIG. 1 embodiment, are sized to easily engage the cylindrical portion 14 of the shaft 12. The counterbores 40B and 42B, respectively, define together with the shaft 14 annular chambers 40C and 42C which house Belleville springs 48.

The principal difference between the embodiment of FIG. 4 and that of FIG. 1 is that the strut portions 44 and 46 of the FIG. 4 embodiment deflect under stress along with the Belleville springs to more tightly engage with the cylindrical portion 14 of the shaft 12 as the ring of studs 20 is tightened.

From the foregoing it will be apparent to those skilled in this art that there is herein shown and disclosed new and useful torque transmitting couplings which will have wide application. While preferred embodiments have been herein shown and described, applicants claim the benefit of a full range of equivalents within the scope of the appended claims.

We claim:

1. A coupling for transmitting torque between shafts comprising in combination:
   a. an input and an output shaft in substantially aligned relation to each other,
      a''. an end portion of one of said shafts being smooth and cylindrical;
   b. a pair of annular bolting flanges rigidly supported on an end portion of the other of said shafts and surrounding said end portion of said one shaft, said flanges having counterbores in their adjacent radial faces substantially larger in diameter than said end portion of said one shaft;
   c. at least one Belleville spring between each bolting flange and the end portion of said one shaft, said springs having unstressed internal and external diameters to closely surround said end portion of said one shaft and to closely fit in said counterbores of said flanges; and
   d. means to draw said flanges toward each other to flex said springs into firm gripping engagement with said end portion of said one shaft and the inner surfaces of said counterbores.

2. A coupling as defined by claim 1 in which there are a plurality of Belleville springs disposed in the annular area between said counterbores and the end portion of said one shaft.

3. A coupling as defined by claim 1 in which said springs are radially slotted to increase their flexibility.

4. A coupling as defined by claim 2 in which said springs are radially slotted to increase their flexibility.

5. A coupling as defined by claim 1 in which said bolting flanges each include an outer annular hub portion and a relatively flexible conical web portion extending inwardly from said counterbore and terminating in a main bore sized to smoothly engage the outer surface of said end portion of said one shaft, with that end of said conical portion toward the apex of the cones facing each other.

* * * * *